United States Patent Office 2,777,288
Patented Jan. 15, 1957

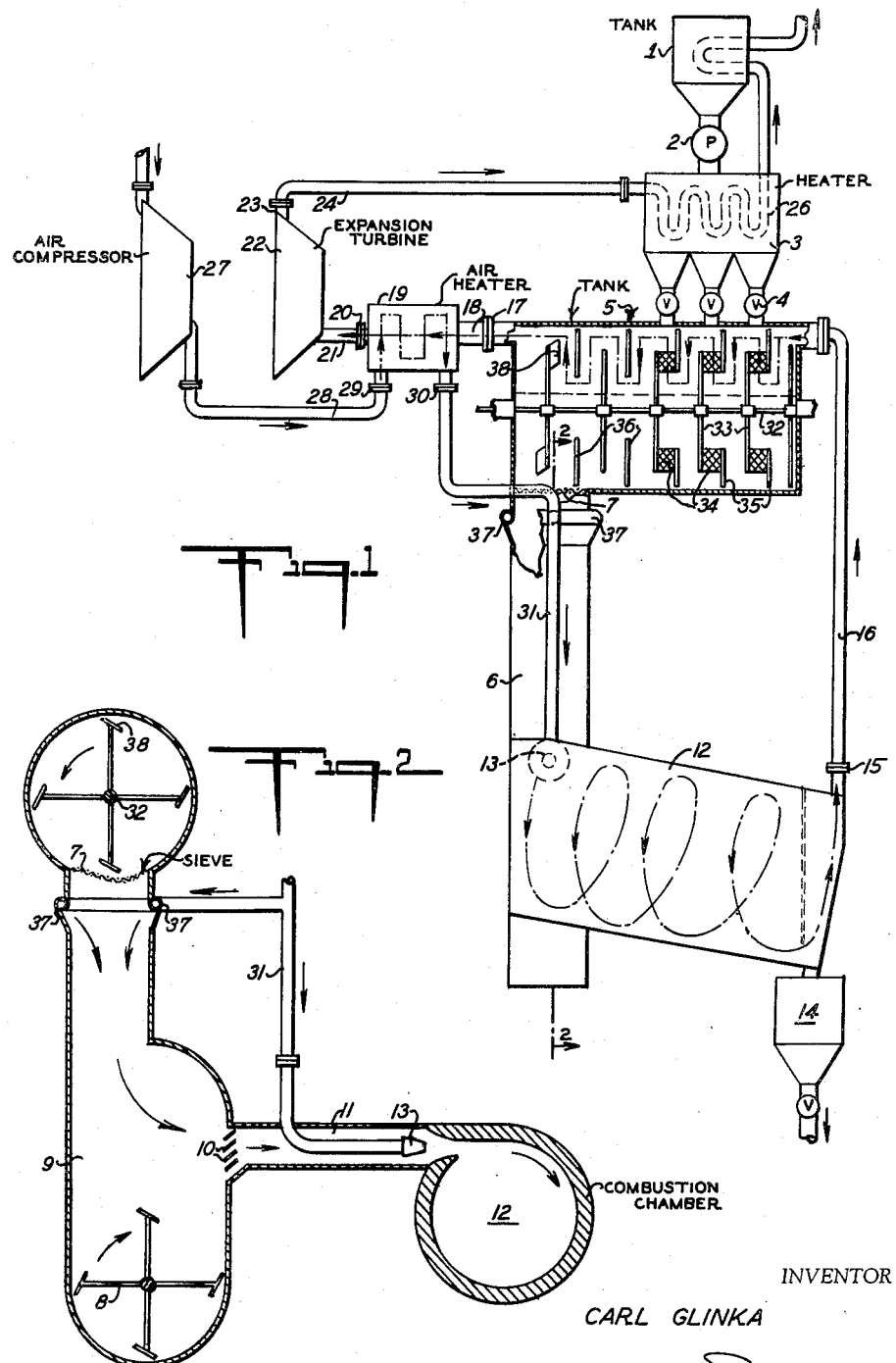

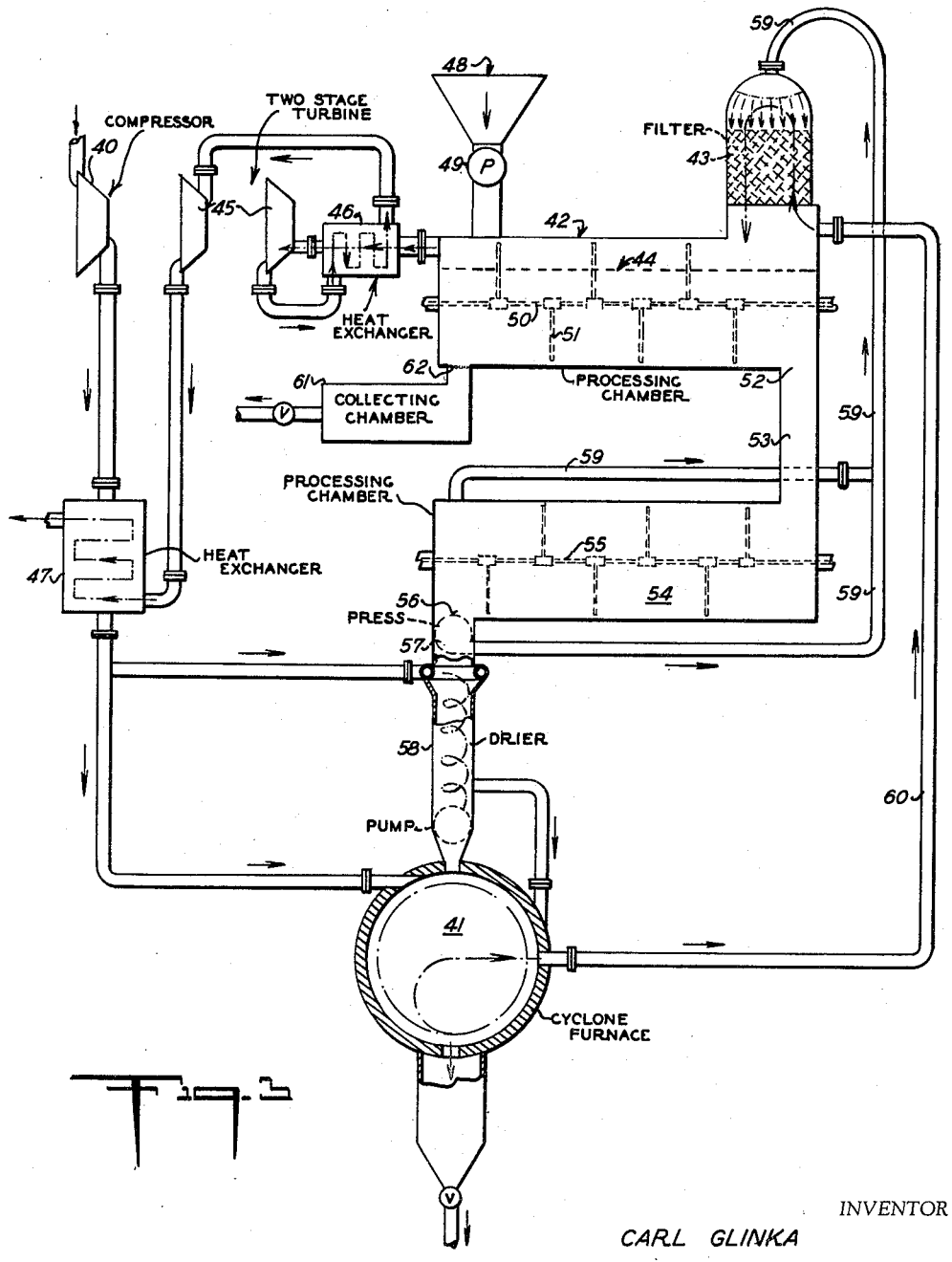

2,777,288

PROCESS AND APPARATUS FOR THE GENERATION OF MECHANICAL ENERGY FROM SOLID FUELS HAVING A HIGH WATER CONTENT

Carl Glinka, Krefeld-Uerdingen, Germany

Application April 2, 1952, Serial No. 280,088

24 Claims. (Cl. 60—39.04)

The object of the invention is a process for the generation of power from fuels having a high water content, or from fuels which have such a high water content that the mixture of water and fuel is in a liquid condition.

The usual practice is to separate the water from the solid fuels before they are used for firing purposes as far as possible by mechanical means, because thermal removal of water is less economical.

In accordance with the invention, however, this liquid condition of the fuel is preferred because such condition will permit the deposit of all flue dust carried along with the flue gases produced during combustion, and in a most economic way. Moreover, a liquid condition of the fuel will enable the temperature of the flue gases to be reduced to such an extent that they can readily be used in a power engine, for instance a gas turbine. As a matter of fact the process embodying my invention will insure a conversion of thermal energy directly into mechanical energy in a technically perfect and exceedingly economical way.

The essential features of the process embodying my invention are that the flue gases produced in a combustion chamber under pressure are caused to pass under pressure through a chamber charged with fuel having so high a water content that the mixture of water and fuel is in a liquid condition; and that in the said chamber the combustion gases are brought in close contact with the mixture of water and fuel so that all flue dust carried along by the combustion gas is caused to deposit; and that owing to the evaporation of a portion of the water contained in the mixture of water and fuel, the flue gases are cooled down to such an extent that they can readily be used in an expansion power engine.

The treatment of the combustion gases produced under pressure by means of a mixture of fuel and water, likewise under pressure, may be realized, for instance, by means of filters, wet cyclones, nozzles, centrifugal impellers or the like. These devices may be arranged in such a way that they are protected against exessive heat by the water; and that at the same time any deposits of ash and dust particles are washed away by the water. The steam generated during the filtering of the flue gases is allowed to escape to the expansion power engine, together with the combution gases. By adopting this procedure an essential portion of the loss of energy due to the cooling of the flue gases is made up. The amount of the water evaporation may be regulated in several different ways, depending on the device selected. An increase of the amount of water evaporated may be obtained by using a filter having a large evaporation area whereas a reduction of the amount will be obtained by using a device having a small evaporation area, for instance a device in which the dust particles are diverted into a water stream by centrifugal force.

The process embodying my invention is of special importance in those cases where fuels present themeselves in nature or industry in a condition which permits a direct application of the process. In this connection we may mention for instance the utilization of the waste water from coal washing plants which as a rule contains some 20% of combustible dry material, or the utilization of the waste sulphate lye from the cellulose industry which usually contains 12–14% of combustible solid matter.

Peat having a water content of 90% is in the condition of a thick sludge whereas lignite having a water content of 60% is still in a lumpy condition. To these fuels such quantities of water may be added as required for the realization of the process embodying my invention. The excess water, viz. the quantity not evaporated in the course of the process remains within the process as circulating liquid and which may be used for mixing with the incoming fuel, said water is separated from the fuel in process at any suitable point.

The process is carried out under pressure, the amount of which is generally dependent on the drop in temperature to be utilized during the expansion of the working gases. In the case where the fuels being utilized contain water in the form of colloidally inherent moisture, for instance peat or waste sulphate lye from the cellulose industry, the inherent moisture may be driven out by exposing the liquid fuel to a sufficiently high temperature and a sufficiently high pressure. Such treatment will insure a destruction of the colloidal properties of the fuels, and if there is a further increase of the temperature and pressure a carbonization will take place whereby the greater proportion of the moisture contained in the fuel will be separated out so that, the process according to the invention may be carried through without having to add any additional water. In order to destroy the colloidal properties of the fuels the mixture of water and fuel must be brought to a temperature of 175–200° C. and for the initiation of the carbonization process the temperature must be raised to 200–240° C. It is understood that these temperatures can only be obtained under the corresponding pressures.

Further salient features of the invention may be gathered from the examples given hereunder. Attention is drawn to the fact that the drawing is schematical only.

Fig. 1 is a diagrammatic vertical section of a plant for the carrying out of a process embodying my invention.

Fig. 2 shows a longitudinal section along the line II—II of Fig. 1.

Fig. 3 is a further embodiment of the invention shown in diagrammatic vertical section.

The plant in Figs. 1 and 2 shows a tank 1 which is filled with a liquid mixture from a washing plant for bituminous coal—mixture consisting of in addition to the combustible material 18% of non-combustible matter and 64% of water. Tank 1 is connected through pump 2 to a pre-heating tank 3 which, in its turn, through a number of valves 4, is connected to the tank 5, the mixture being fed to the said tank through the adjustable valves 4. The tank 5, and also the pre-heating tank 3, are under the working pressure of, for instance 12 atmospheres, the pump forcing the mixture into the pre-heating tank 3 under the working pressure mentioned. One end of the lower part of the tank 5 is connected to the drier 6 which is separated from the tank 5 by the sieve 7. The thickened mixture, in a paste condition, is passed through the sieve 7 into the drier and then into an enlarged chamber 9 in which the fuel is disintegrated by means of the rotating cross beater system 8. Chamber 9 is connected to the combustion chamber through the Venetian blind type lattice 10 and the pipe 11. The combustion chamber 12 is of the "Cyclone type." The combustion air entering tangentially through nozzle 13 passes through the combustion chamber as shown by the dot and dash line. The slag is drawn off in a liquid condition through the discharge 14. In cases where the solid matter of waste sulphate lye is utilized as a fuel, the slag discharge may also be used for the separation of the liquified alkaline trituration media.

The flue 15 of the combustion chamber is connected to the tank 5 by piping 16. On the opposite side the tank 5 is fitted with the flue gas duct 17 which is connected to the inlet 18 of air heater 19. The outlet 20 of the air heater 19 is connected to the inlet of an expansion turbine 22, the outlet of which is connected to a piping which passes through the tank 3 in the shape of a heating coil 26. The turbine 22 may be used, for instance, for the driving of an electric generator (not shown). Moreover it is connected to an air compressor 27, the discharge end of which is connected to a piping 28 which leads to the second inlet 29 of the air heater 19. The second outlet 30 of the air heater 19 is connected through the pipe 31 to the air nozzle 13 of the combustion chamber 12.

The tank 5 is essentially in the shape of a horizontal cylinder. In its centre-line there is a shaft 32 which is capable of being rotated by a driving mechanism (not shown). By means of disks 33 the shaft is fitted with a number of annular containers 34, which, for instance, may be arranged concentrically. These containers are designed as filtering chambers, and to this effect they are filled, for instance, with filling bodies. On their outer side, the filtering containers 34 are fitted with disks 35 which nearly come in contact with the walls of the tank 5.

The working of the plant is as follows: The washing water is passed into the tank 1 and, by means of the pump, 2, lifted into the pre-heating tank 3, where it is pre-heated by the heating coil 25 through which the hot waste gases are circulating. The pre-heated washing water is caused to pass into tank 5 filling it to a level slightly above the shaft 32 rotating therein. During the rotation of the shaft 32 the filtering rings fixed thereon pass through the washing water where they yield up the heat they had taken up during their exposure to the flue gases. The filtering media emerge again from the liquid mixture in a moist condition. From the combustion chamber 12 the flue gases having a temperature of approx. 1500° C. pass through the upper part of the tank, along the dot and dash line, and on their way they pass radially through the filtering rings 34 causing the flue dust carried along with the gases to adhere to the wet surfaces of the filtering media. At the same time, the heat taken up by the filtering media during the period they were exposed to the circulating hot flue gases is transmitted to the liquid mixture during the immersion period. Within the tank the washing water mixture moves towards the discharge side from where is passes through the sieve 7 in a thckened sap-like condition, but still wet enough to descend down into the drier 6 in the form of drops. The movement of the washing mixture towards the discharge side is partly due to the action of the vanes 36 fixed to the shaft, the object of which is moreover to transmit to the mixture the heat required for the evaporation of the moisture. The paddles 38 rotating above the sieve 7 assist the passage of the thickened mixture through the sieve 7. The moisture driven out of the mixture goes with the flue gases through the outlet 17 of the tank 5 and via the heat exchanger 19 into the turbine 22. Owing to the water evaporation the flue gases which at their entry into the tank 5 have a temperature of 1500° C. leave the tank 5 cooled down to a temperature of approx. 800° C., and subsequently in the heat exchanger 19 they yield another 150° C. to the combustion air on its passage from 29 to 30 so that eventually they enter the turbine 22 at the permissible temperature of 650° C. The whole plant, as far as the parts 5, 6, 9, 11, 12, 16, 19, 28 and 31 are concerned, is under an essentially equal pressure which in the case under review is taken at 12 atm.

The mixture in the tank 5, though thickened, but still in a liquid condition, which is to take up the remaining flue dust, drops through the sieve 7 into the drier 6 in the form of drops or of a thick paste. A portion of the pre-heated combustion air is caused to pass from the duct 31 through the opening 37 into the drier 6 where the remaining moisture of the fuel is evaporated. The fuel is pulverized in chamber 9 by the rotary cross heater, the pulverized fuel being blown through the fuel nozzle 11 into the combustion chamber 12. The lattice 10 prevents coarser particles from finding their way into duct 11 through which the main part of the combustion air is supplied.

The working of the plant shown by Fig. 3 is similar: The combustion air, first compressed in the compressor 40 to the working pressure of the plant, is admitted to the cyclone furnace 41. The combustion takes place at a temperature well over the fusion point of the ash so that the latter may be drawn off in a liquid condition. The rest of the flue dust, corresponding to approx. 0.3 gm. per mm.³ goes with the flue gas through a duct 60 into the first processing chamber 42. Inside this chamber 42, filters 43 are arranged with ceramic filtering media which are scoured by the water separated out in the second processing chamber 54. By these filters 43, the flue gases are rendered absolutely clear of all entrained flue dust, and at the same time their temperature is reduced to such an extent that they can readily be utilized in the subsequent power generation process. The reduction of the temperature of the flue gases is arranged in such a way that part of the heat of the flue gases is transferred to the mixture of water and fuel 44. The mixture of hot flue gases and steam may be utilized under the selected working pressure of 36 atm. for the operation of a two stage turbine 45. The waste gases from the first stage of this turbine are passed through a heat exchanger 46 through which a mixture of flue gases and steam is circulated. In this heat exchanger the temperature of the mixture is further reduced to the temperature which the turbine can deal with, viz. approx. 650° C., and in the first expansion stage another reduction of the temperature to approx. 300° C. takes place. The waste gases from the first stage are caused to pass through the heat exchanger 46 at a pressure of approx. 6 atm. and during their passage through the heat exchanger 46 they are heated up again to approx. 650° C., and in the second stage of the turbine 45 they are allowed to expand. The remaining heat of the flue gases is utilized in the heat exchanger, 47, for the pre-heating of the combustion air.

The fuel is passed at 48 by means of the pump 49 into the first processing chamber 42, and by means of the rotary shaft 50 which is fitted with blades 51 fixed thereto, towards the outlet 52. Over the connecting canal 53 the mixture of water and fuel is passed into the second processing chamber 54 where the conveyor 55 moves it towards the discharge 56, and after dewatering by means of press 57 through the drier 58 to the furnace 41. In the first processing chamber 42 the mixture of water and fuel is heated, partly by means of the water 59 separated out in the second processing chamber 54, the flow of the hot water being opposite to that of the incoming fuel mass. The water thus cooled passes through the filter 62 into the collecting chamber 61. The cooled water which is still under pressure, may be used for extraction or transportation of the raw fuel. The mixture of water and fuel in the first processing chamber is under the working pressure of the plant, for instance 36 atm. In the free space of the tank, a mixture of gas and steam is formed in such a composition that the partial pressure of the steam is 9 atm. and the pressure of the gases 27 atm. In accordance with the partial pressure of the steam, the mixture of water and fuel will be heated to a temperature of 175° C., i. e. the temperature at which the colloidal properties of the fuel are done away with. The second processing chamber 54 is in connection with the first processing chamber 42 over the canal 53, so that the total pressure of 36 atm. is communicated over the liquid mixture to the mixture in the second processing chamber. In accordance with the pressure, the temperature of the mixture of water and fuel will then, i. e. after initiation of the carbonization—which is an exothermal process—go up to 240° C.

What I claim is the following:

1. Method for the generation of mechanical energy by the combustion of solid fuels which comprises, establishing a first zone and a combustion zone, maintaining a mixture of water and solid fuel in said first zone, passing said mixture of water and solid fuel from said first zone into said combustion zone, burning said solid fuel in said combustion zone, recycling hot combustion gases out of said combustion zone, through said first zone to thereby remove the flue dust entrained in said combustion gases, evaporate a portion of the water contained within said first zone and cool said combustion gases, and thereafter passing said combustion gases into an expansion power engine for utilization therein.

2. Method according to claim 1 which comprises drying said mixture prior to its passage into said combustion zone.

3. Method according to claim 1 in which said solid fuel contains colloidally inherent moisture and which includes treating said fuel at a temperature sufficient to eliminate the colloidal properties of said fuel.

4. Method according to claim 3 which comprises treating said fuel at a temperature sufficient to initiate carbonization of said fuel.

5. Method according to claim 1 which comprises establishing a second zone, maintaining a body of water in said second zone and passing said mixture of water and solid fuel from said first zone, into, through and out of said second zone, prior to passing said mixture into said combustion zone.

6. Method according to claim 1 in which said expansion power engine is a two-stage power engine, and in which said combustion gases pass in heat exchange contact with the waste gases from the first stage of said two-stage engine.

7. Method according to claim 6 which comprises passing said waste gases from said first stage into the second stage of said engine.

8. Method according to claim 1 in which a portion of said water contained in said first zone is passed through a filter and contacted with said hot combustion gases.

9. Apparatus for the generation of mechanical energy by the combustion of solid fuels which may contain substantial amounts of moisture which comprises means defining a first substantially closed liquid chamber, means defining a combustion chamber, and an expansion power engine, means for passing solid fuel into said first chamber, conduit means connecting said first chamber and said combustion chamber, means for burning solid fuel in said combustion chamber, conduit means connecting said combustion chamber and said first chamber for passing combustion gases from said combustion chamber into said first chamber for their passage therethrough, means in said first chamber for the removal of at least a portion of the entrained particles contained in the combustion gases passing therethrough, and conduit means connecting said first chamber with said power engine.

10. Apparatus according to claim 9 which includes drying means positioned between said first chamber and said combustion chamber, for drying said fuel prior to burning said fuel in said combustion chamber.

11. Apparatus according to claim 10 in which said drying means is a heating drying means.

12. Apparatus according to claim 10 in which said drying means is a pressing drying means.

13. Apparatus according to claim 9 which includes mixing means positioned in said first chamber for mixing solid fuel and water contained therein.

14. Apparatus according to claim 13 in which said mixing means includes a shaft axially rotatably positioned in said first chamber and a multiple number of disks positioned perpendicular to and in contact with said shaft.

15. Apparatus according to claim 9, in which said means for removing a portion of the entrained particles are filtering means positioned within said first chamber for filtering combustion gases passing therethrough.

16. Apparatus according to claim 9 which comprises means defining a second substantially closed chamber for water and solid fuel positioned between said first chamber and said combustion chamber and which includes conduit means connecting said first chamber with said second chamber and conduit means connecting said second chamber with said combustion chamber.

17. Apparatus according to claim 9 in which said first chamber is positioned above said combustion chamber.

18. Apparatus according to claim 9 in which said expansion power engine is a turbine.

19. Apparatus according to claim 9 which comprises a second expansion power engine and which includes conduit means connecting said second power engine with the first power engine.

20. Apparatus according to claim 9 which includes sieve means positioned between said first chamber and said combustion chamber.

21. Apparatus according to claim 9 which includes pulverizing means for pulverizing said solid fuel prior to its passage into said combustion chamber.

22. Apparatus according to claim 9 which includes partition means defining a tortuous path of flow for said combustion gases through said first chamber.

23. Apparatus according to claim 22, in which said means for removing a portion of the entrained particles contained in said combustion gases are filter means positioned within said tortuous path of flow.

24. Apparatus according to claim 23 in which said filter means comprises an axially rotatable shaft positioned within said chamber, at least one disc positioned perpendicular to said first mentioned shaft with a filter connected for rotation therewith between at least two of said partitions.

References Cited in the file of this patent

UNITED STATES PATENTS

| | | |
|---|---|---|
| 1,988,456 | Lysholm | Jan. 22, 1935 |
| 2,186,706 | Martinka | Jan. 9, 1940 |
| 2,465,464 | Meyer | Mar. 29, 1949 |
| 2,601,390 | Hague | June 24, 1952 |
| 2,648,950 | Miller | Aug. 18, 1953 |

FOREIGN PATENTS

| | | |
|---|---|---|
| 508,644 | France | July 30, 1920 |

OTHER REFERENCES

"Successful Tests of a Peat-Burning Turbine" appearing in The Oil Engine and Gas Turbine, January 1952, pages 380 to 383.